United States Patent [19]

Javan

[11] Patent Number: 4,841,529
[45] Date of Patent: Jun. 20, 1989

[54] SYSTEM FOR GENERATING A STABLE OPTICAL FREQUENCY

[75] Inventor: Ali Javan, Cambridge, Mass.

[73] Assignee: Laser Science, Inc., Cambridge, Mass.

[21] Appl. No.: 94,423

[22] Filed: Sep. 9, 1987

Related U.S. Application Data

[62] Division of Ser. No. 915,652, Oct. 6, 1986, abandoned.

[51] Int. Cl.$^4$ ................................................ H01S 3/13
[52] U.S. Cl. ...................................... 372/32; 372/28; 372/30; 330/4.3; 332/7.51
[58] Field of Search ................. 372/29, 30, 32, 18, 372/26, 28, 21; 330/4.3; 332/7.51

[56] References Cited

U.S. PATENT DOCUMENTS

| | | | |
|---|---|---|---|
| 3,686,585 | 8/1972 | Javan et al. | 372/32 |
| 4,329,664 | 5/1982 | Javan | 372/32 |
| 4,338,578 | 7/1982 | Sukhman | 372/29 |
| 4,410,992 | 10/1983 | Javan | 372/32 |
| 4,660,206 | 4/1987 | Halmos et al. | 372/28 |
| 4,666,295 | 5/1987 | Duvall, III et al. | 332/7.51 |

OTHER PUBLICATIONS

Lachambre et al; "Frequency and . . . CO$_2$ Laser"; IEEE J. of Quantum Elec., vol. QE-14, No. 3; 03/1978.

Hough et al; "Dye-Laser . . . Optical Resonators"; Appl. Phys. B33, 179-185 (1984).

Primary Examiner—William L. Sikes
Assistant Examiner—Xuan T. Vo

[57] ABSTRACT

A system for generating a stable optical frequency from a laser signal having inherent frequency fluctuations. The signal from an injection-controlled pulsed laser is divided into two parts. One part is mixed with the signal from a stable CW laser to generate beat frequencies. These signals are amplified and recombined with the pulsed laser signal in an output modulator. In one embodiment, the difference frequency between the pulsed laser and the reference signal is less than 1000 MHz. The beat frequencies are increased by an X-band mixer to the microwave range where they can be readily amplified in an available broad band amplifier. In another embodiment, the transmitter laser and the reference laser operate at a difference frequency in the microwave range, say, above 5,000 MHz. The beat frequencies are obtained by a high frequency mixer such as a bulk crystal in a waveguide or cavity. In still another embodiment, two independent transmitter lasers generate pulses that occur with a significant time delay. These two signals are combined, amplified and mixed to obtain the desired sideband signals. The subsequent corrective modulation eliminates the frequency fluctuations in each pulse and results in coherent time-delayed pulses.

8 Claims, 4 Drawing Sheets

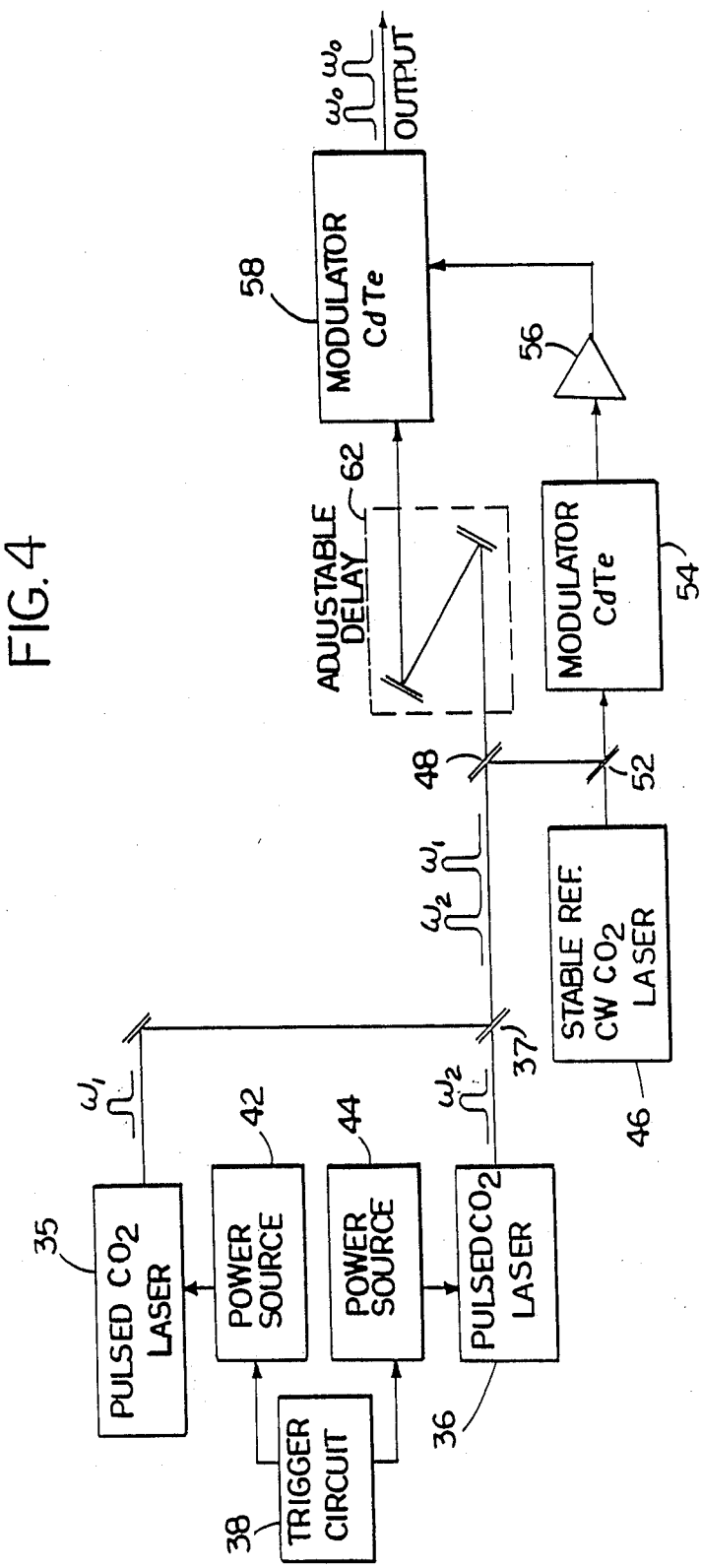

SYSTEM FOR GENERATING A STABLE OPTICAL FREQUENCY

Cross Reference to Related Application

This application is a division of application Ser. No. 06/915,652 filed Oct. 6, 1986 now abandoned.

BACKGROUND OF THE INVENTION

1. Field of the Invention:

This invention relates to an improved system for modulating the output from a laser to remove frequency instabilities.

2. Brief Description of the Related Art:

It is known that a laser frequency can be stabilized against the frequency of an external reference laser by an automatic feedback control, AFC. This stabilization is achieved by introducing a corrective signal to the laser frequency tuning mechanism by way of a feedback loop. The corrective signal is obtained by reference to a laser frequency signal, for example, from a highly stable low-power CW laser. Various stabilization refinements may be incorporated, including frequency stabilization against a narrow Doppler-free resonance as described in U.S. Pat. No. 3,686,585 to Javan and Freed. However, the radiation frequency of lasers fluctuates, under some conditions, at very high speeds requiring a correspondingly high speed correction of the laser output. The frequency stabilization techniques described above cannot be used if the frequency fluctuation occurs at a rate higher than the response time limit of the laser tuning mechanism. Frequency variations occurring from pulse to pulse and within the pulse may both occur at rates high enough to preclude correction by the laser tuning techniques.

In U.S. Pat. No. 4,329,664 the present inventor describes an adaptive approach to frequency control, ADFC, for the generation of stable frequency radiation at an optical frequency. This approach is different from an AFC method in that it does not utilize a feedback loop. A small sample of the signal from a power laser that produces optical radiation at a frequency, $\omega$, subject to short-term frequency variations is combined with a signal from a highly stable reference laser to generate a difference beat frequency signal, $\omega_m$, in the radio frequency range having frequency variations corresponding directly to the fluctuations of the laser frequency. The resulting signal represents the instantaneous difference between the primary laser signal and that of the reference laser. This difference signal is amplified and recombined in a modulator with the signal from the primary laser to produce a stable optical signal. The system corrects for both intrapulse In one application, the frequency, $\omega_o$, of an injection-controlled, pulsed $CO_2$ laser is maintained at an rf offset with respect to the stable reference CW laser at frequency $\omega_r$. $\omega_o$ is time dependent because of the intrapulse frequency chirp and instabilities. The mixer output voltage, $V_b = V_c(t)\cos(\delta t + \phi)$, will appear at the rf beat frequency $\delta = \omega_o(t) - \omega_r$. The beat-frequency $\delta$ exactly reproduces the time dependence of $\omega_o(t)$. A CdTe modulator is driven by the beat-voltage signal, after amplification in a broad-band, high-gain amplifier. The two rf sidebands on the IR output of the modulator will appear at $\omega_{\pm} = \omega_o(t) \pm \delta(t)$. Note, for example, for $\omega_r < \omega_o(t)$, the down-shifted sideband, $\omega_{13}$, exactly reproduces $\omega_r$, if the pulse from the primary laser is delayed and adjusted to be the same as the delay of the amplified rf beat signal in reaching the modulator, the delays being referenced to the rf mixer input. This time-delay difference, $\tau$, can readily be adjusted to values below one nsec by adjusting the path-difference in an optical-delay provided at the modulator input. It is desirable to use a broad rf amplifier bandwidth to minimize the rf beat-delay; otherwise a long optical-delay path-length will be needed to correct for the delay.

In the presence of only a small delay-time difference, $\tau$, the corrected frequency, $\omega_-$ in this example, will appear slightly shifted: $\omega_- = \omega_r - t(dw/at\ o)$. For a during-the-pulse chirp rate of, for example $\tau dw/dt\ o = 200$ kHz/usec and $\tau \leq 1$ nsec, the shift will be $\tau dw/dt\ o \leq 200$ Hz. Since $\tau$ can be adjusted to be substantially less than 1 nsec, a sizeably higher frequency chirp rate can be tolerated, since this 200 Hz limit is readily permissible in most applications.

This technique removes the entire intrapulse chirp and frequency instabilities to values below 200 Hz in the above example. Inspection shows that the pulse-to-pulse fluctuations of $W_o(t)$, are also totally removed from the corrected frequency. For some applications, $\tau$ as large as tens of nsec can be tolerated, thus considerably relaxing the bandwidth requirements of the rf amplifier.

The adaptively corrected frequency, $\omega_o$, will appear as the up-shifted ($\omega_+$) or down-shifted ($\omega_-$) sideband, depending upon whether $\omega_r > \omega_o$ or $\omega_r < \omega_o$. With respect to an efficient generation of the sidebands, a near-unity single-sideband conversion efficiency can readily be achieved by driving the modulator at pulsed peak powers in the multi-kilowatt range.

SUMMARY OF THE INVENTION

The present invention is similar in many respects to the frequency stabilization described above, but the burden for pulsed-modulation at a high peak-power for efficient sideband generation, is shifted from the rf to the x-band, for which a variety of broad-band, high-gain vacuum tube power amplifiers are available. It is important to provide broad band amplification in order to minimize the time delay correction required at the modulator. However, there the beat signals are more easily generated if the difference frequency is in the rf range, say, below 1000 MHz.

In one embodiment, the beat frequencies are generated from two signals having a difference frequency below 1000 MHz and these frequencies are increased by an X-band mixer to the microwave range where they can be readily amplified in an available broad band amplifier. In another embodiment, the transmitter laser and the reference laser operate at a difference frequency in the microwave range, say, above 5,000 MHz. The beat frequencies are obtained by a high frequency mixer such as a bulk crystal in a waveguide or cavity. In still another embodiment, two independent transmitter lasers generate pulses that occur with a significant time delay. These two signals are combined, amplified and mixed to obtain the desired sideband signals. The subsequent corrective modulation eliminates the frequency fluctuations in each pulse and results in coherent time-delayed pulses.

BRIEF DESCRIPTION OF THE DRAWING

FIG. 4 illustrates a system in which pulses from two independent transmitter lasers are stabilized by a single adaptive control circuit.

DESCRIPTION OF THE PREFERRED EMBODIMENTS

Figure 1:
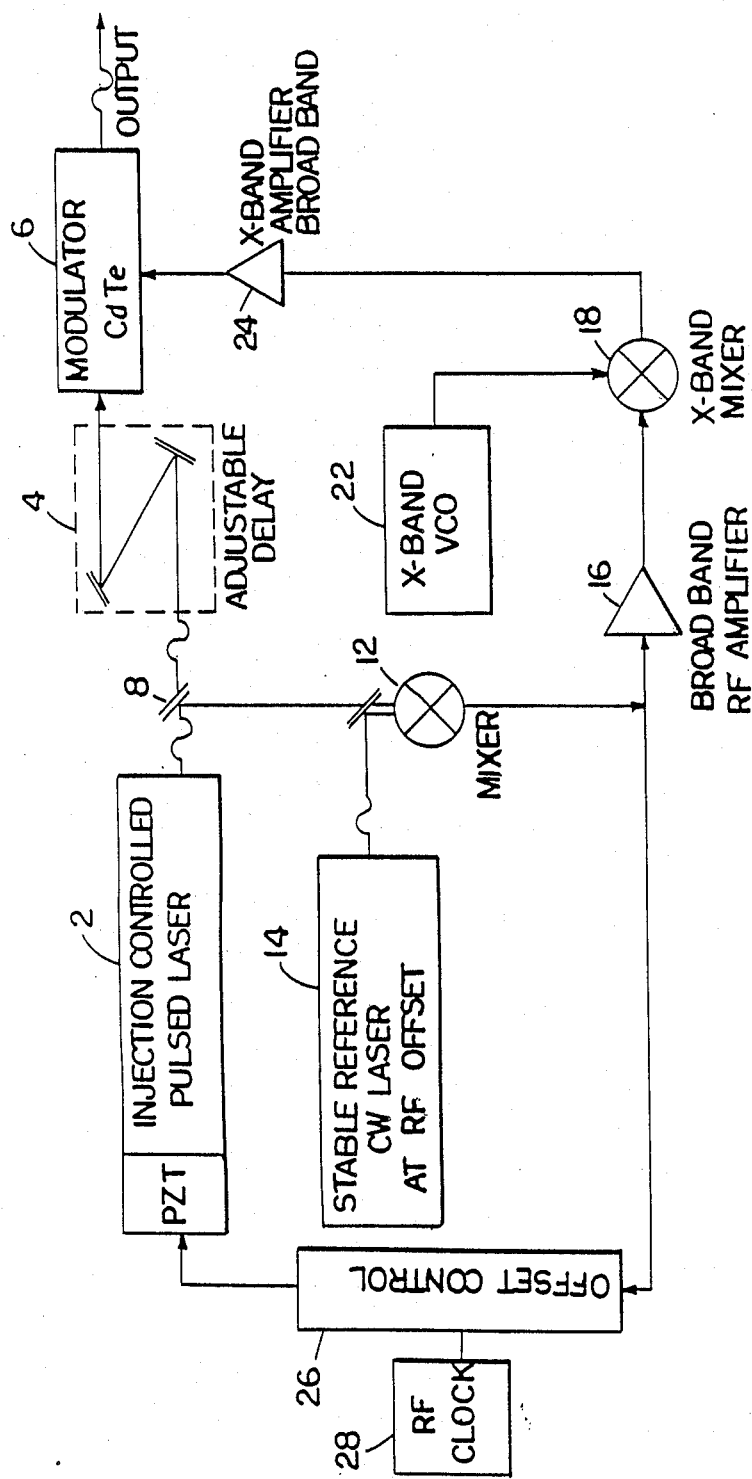
FIG. 1 illustrates a system for generating a stable optical frequency in which the frequency difference between the transmitter laser and the reference laser is in the rf frequency range and the resulting beat frequencies are increased to the microwave region in a high frequency mixer prior to amplification.

In the embodiment shown in FIG. 1, the signal from an injection-controlled pulsed laser 2, is passed through an adjustable time delay 4 and a CdTe modulator 6 to the output. A small sample of the laser signal, derived by the use of a conventional beam-splitter 8, is combined, in a mixer 12, with the signal from a stable CW reference laser 14 that is maintained at an rf offset frequency, for example, below 1000 MHz, from that of the primary laser 2. The rf beat signal from the mixer 12 is amplified by a broad-band rf amplifier 16 and then up-converted to an x-band frequency, say, between 5,200 and 19,900 MHz, in an x-band/rf mixer 18, using an x-band voltage-controlled oscillator (VCO) 22. The mixer output (single-sideband) is then fed to a broad-band x-band pulsed high-power amplifier 24. The signal level at the x-band amplifier input need not exceed several watts peak power, thus permitting the use of existing state-of-the-art broad-band solid state rf amplifiers, x-band VCO's, and mixers at the front end of the x-band power amplifier 24. The IR single sideband at the output of the modulator 6 will have the exact adaptive frequency control characteristics discussed above. This embodiment permits the chirp- or pulse-burst, or other waveform, to be introduced by appropriately programming the VCO 22 to operate in the chirp-burst or the pulse-burst mode. One important difference from earlier systems is the addition of the ADFC signal to the front-end driver of the x-band power amplifier 24. The long term stability of the pulsed laser is increased by the use of a feedback offset control circuit 26 which is connected between the output of the mixer 12 and the frequency control mechanism PZT of the primary laser 2. The constant offset frequency is maintained by means of an rf clock 28.

Figure 2:
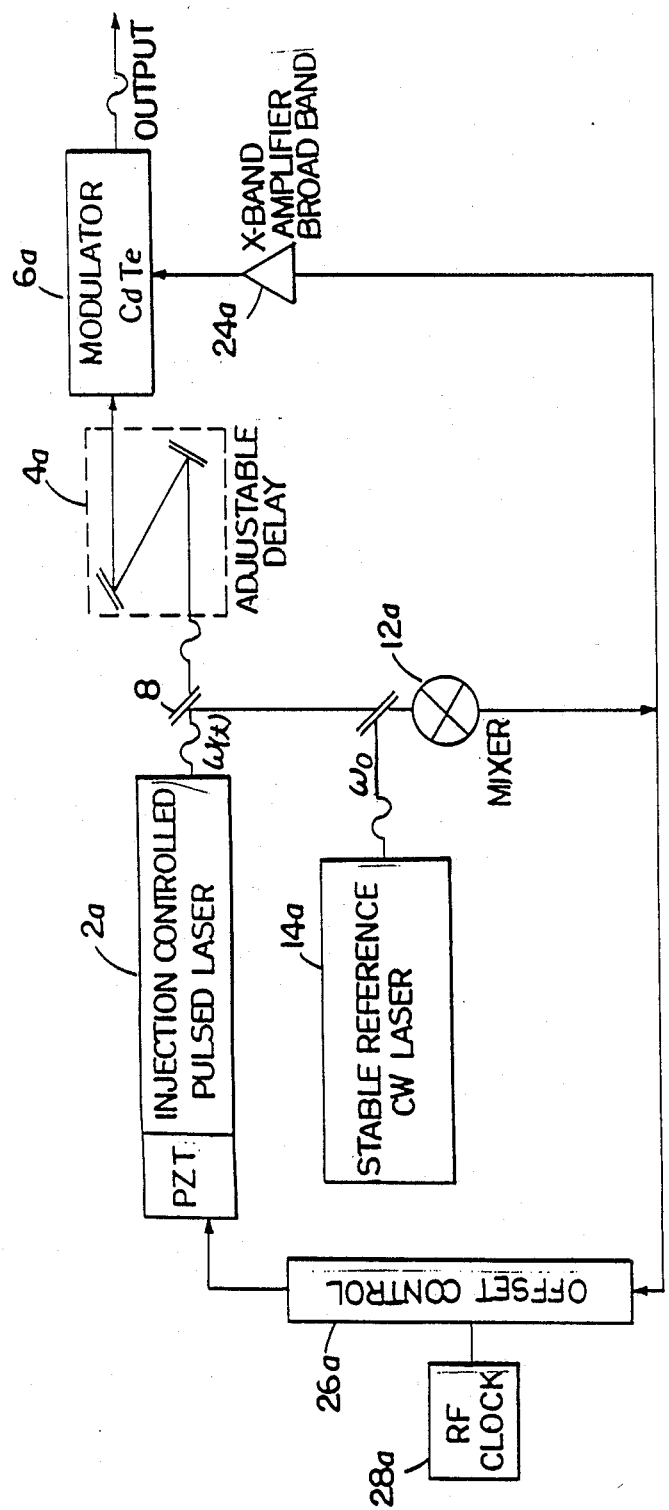
FIG. 2 illustrates a system in which the transmitter laser and the reference laser operate at frequencies differing by a microwave frequency and which are combined in a bulk non-linear crystal.

In the embodiment illustrated by FIG. 2, the microwave control signal is generated directly from initial beat frequencies obtained at a microwave frequency. In this case, the stable CW reference laser 14a is chosen to be one that operates at a microwave offset frequency from the frequency of the transmitter laser 2a. For example, the primary laser 2a may operate with a normal isotopic $CO_2$ gas mix while the reference laser 14a operates on an enriched isotopic $CO_2$ gas mix. It is known in this situation, the $CO_2$ transition in the transmitter laser 2a and the reference laser can be chosen to be offset by a microwave frequency. Another alternative is the use of a transmitter laser 2a and a reference laser 14a in which both gas mixtures are the same isotopic species and the two lasers operate on the same transition. For the CW reference laser, however, the output is frequency shifted at a microwave frequency using an electro-optic modulator. Because for the reference laser even tens of watts will be sufficient for the embodiment described here, the electro-optic modulation of the reference laser need not be done at high efficiency. Even an efficiency of 5 or 10% (or less) can be adequate, depending upon the power of the reference laser 14a.

The output of the transmitter laser 2a and the reference laser 14a are mixed in a high-speed detector 12a, which may be a point-contact MOM (metal-metal oxide-metal) or MOS (metal-oxide semiconductor) junction of the type previously described by the inventor in U.S. Pat. No. 4,329,664. In this case, the beat signal is directly fed to a broad-band microwave amplifier 24a and then to a CdTe crystal modulator 6a as in the previous embodiment.

Figure 3:
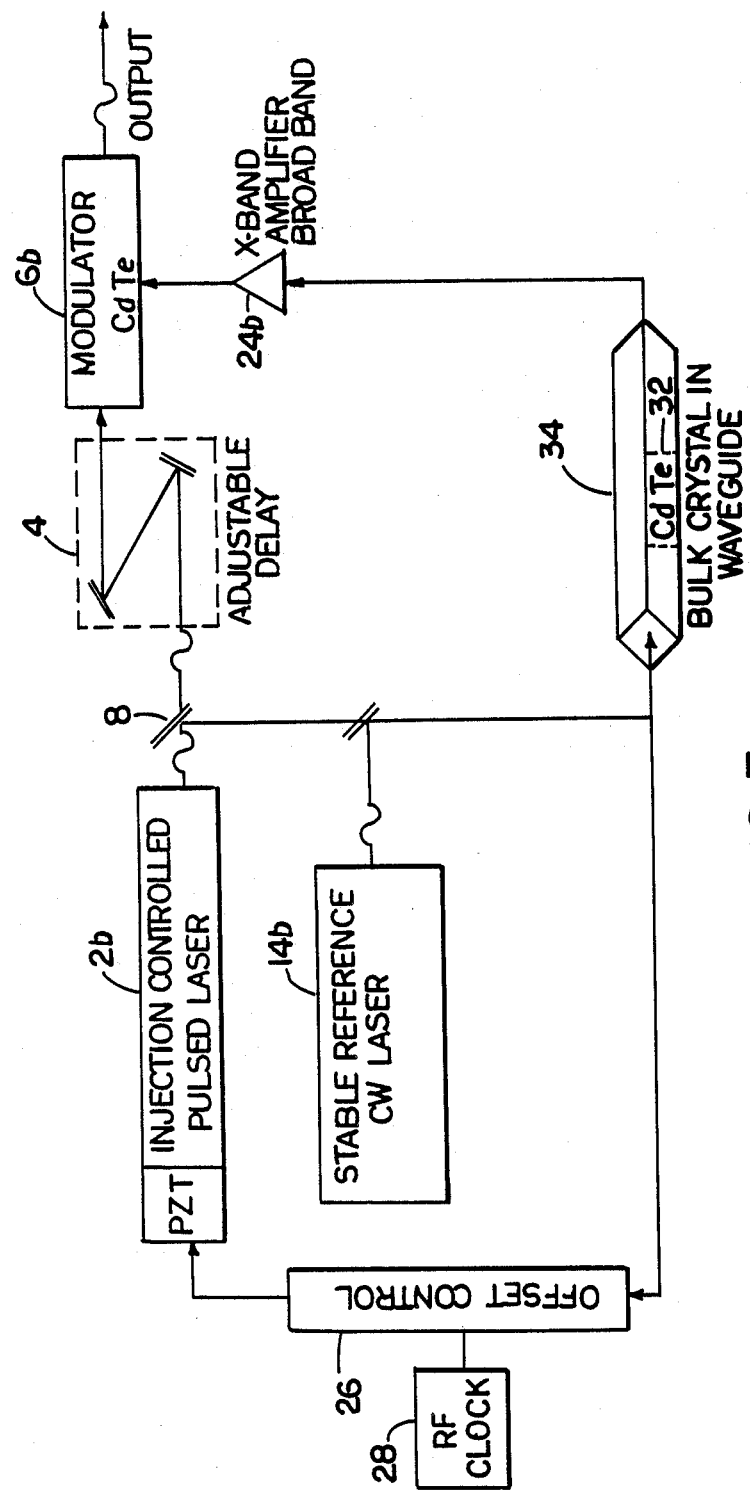
FIG. 3 shows a system similar to that shown in FIG. 2 but in which the frequency mixing is done in an elector-optic control that produces a microwave difference is a waveguide.

FIG. 3 illustrates another embodiment in which the transmitter laser 2b and the reference laser 14b operate at a microwave offset frequency as in the previous embodiment. The frequency mixing, however, is done in an electro-optic crystal 32, which may also be a CdTe crystal, that directly produces the microwave difference frequency in a waveguide or microwave cavity, diagrammatically illustrated at 34. The resulting beat frequency is fed through a broad-band x-band microwave amplifier 24b to the CdTe modulator 6b as before.

The adaptive frequency processor system described here will remove the frequency fluctuations of injection controlled lasers or other kinds of lasers operating on a single frequency. The embodiments described here also permit the introduction of the desired waveform envelope of the transmitted laser pulse.

In the embodiment illustrated by FIG. 4, two pulsed lasers 35 and 36 operate at the same $CO_2$ transition. Each laser is assumed to operate on a single frequency (single mode). The two frequencies are further assumed to be e.g., near line center. In this case, the two frequencies may differ by e.g., tens of MHz, depending upon their respective resonator modes. The two laser outputs will suffer from intrapulse and pulse-to-pulse fluctuations as described previously. Consider the two pulsed laser outputs to be combined with a beam splitter 37 as shown in FIG. 4. The two lasers, however, do not generate pulses at the same instant. A trigger circuit 38 is coupled to the power supplies 42 and 44, respectively, of the lasers 35 and 36. The output of the combined beams consists of two colinear pulses appearing with a time delay. For example, each pulse may have a pulse length of 1 usec and the pulse from the laser 36 will be delayed by 100 usec with respect to the pulse from laser 35. The two pulses will be incoherent with respect to each other and there will be no relationship between their frequencies.

Consider the combined beams to be subjected to the adaptive frequency processing of any of the two earlier embodiments. A stable CW $CO_2$ reference laser 46 produces a signal that is combined with a sample from the combined laser beams, by means of beam splitters 48 and 52. This signal is fed into a CdTe mixer 54 to create the necessary beat notes that are then amplified by an amplifier 56 and fed into the output modulator 58. The combined beams from the lasers 35 and 36 are passed also through an adjustable time delay 62 to the output modulator 58. The result is that both pulses will be processed so that the output of the modulator 58 will appear as two delayed pulses at nearly the same frequency. The adaptive processing in this case introduces coherence between the two delayed pulses in a reproducible manner. Each time the two lasers 35 and 36 are triggered, their fluctuating frequencies $\omega_1$ and $\omega_2$, appear at an arbitrary frequency, e.g., in the $CO_2$ line center region. After processing, however, the combined pulses will be at the same frequency $\omega_o$, and will be coherent with respect to each other.

The two delayed pulses at the same frequency have important advantages in laser radar, for example, of the type described in my copending application entitled Bistatic Doppler Laser Radar System for Discrimination, Tracking and Fire Control filed of even date herewith as Ser. No. 915,650. The Fourier transform of the combined pulses at delayed times have reproducible features with narrow characteristic resonances, the width of which will be determined by the time delay between the successive pulses. These narrow features can be used to obtain very small Doppler shifts in a coherent laser radar system.

The adaptive processing described here can be used to remove frequency fluctuations from either a CW or pulsed laser. It is particularly useful for removing the frequency instability of an injection-controlled pulsed $CO_2$ or injection-controlled near UV excimer lasers, such as XeCl and others.

As used in this application, the term electro-optic crystal means a device capable of producing radiation at the difference frequency by means of the crystal refractive index non-linearities. CdTe is an example of such a crystal.

I claim:

1. In a system for generating stable optical pulses, the combination comprising
    a first pulsed laser for generating a laser pulse subject to frequency variations,
    a second pulsed laser for generating a laser pulse subject to frequency variations,
    circuitry for causing the laser pulse generated by said second pulsed laser to occur a predetermined delay interval after the laser pulse generated by said first pulsed laser occurs,
    a stable CW laser for producing a frequency stable reference output,
    a beam-splitter for separating the laser pulses into first pulse portions and second pulse portions, the first pulse portions being spaced by said predetermined interval and the second pulse portions being spaced by said predetermined interval,
    a mixer for combining said first pulse portions of the pulses from said first and second lasers with said frequency stable reference output to produce spaced beat frequency signals,
    an amplifier for amplifying said spaced beat frequency signals,
    a modulator, the amplified, spaced beat frequency signals being applied thereto, and
    a path adapted to couple said second pulse portions of the pulses from said first and second lasers to said modulator, wherein said modulator produces output laser pulses that are coherent with respect to each other, are spaced by said predetermined interval, and have said frequency variations removed therefrom.

2. The combination as claimed in claim 1 wherein said modulator includes a CdTe crystal.

3. The combination of claim 1 wherein
    said path includes an adjustable time delay for delaying the second pulse portions by an amount that makes said second pulse portions coincident in time with the amplified, spaced beat frequency signals at said modulator.

4. The combination as claimed in claim 3 wherein said first and second lasers are injection-controlled $CO_2$ gas lasers operating at the same pulse repetition rate.

5. A method of generating a stable optical frequency comprising the steps of
    generating a first laser pulse subject to frequency variations,
    generating a second laser pulse after a time delay following the generation of said first laser pulse, the second laser pulse being subject to frequency variations,
    generating a frequency stable CW laser reference signal,
    dividing the first and second laser pulses into first pulse portions and second pulse portions,
    mixing the first pulse portions with said CW laser reference signal thereby to generate compensating sideband frequencies,
    amplifying said sideband frequencies, and
    mixing said amplified sideband frequencies with the second pulse portions thereby to eliminate frequency fluctuations from the first and second pulses.

6. The method of claim 5 including the step of
    delaying the second pulse portions prior to mixing with said sideband frequencies by an amount that makes the sideband frequencies coincident in time with said second pulse portions during said mixing thereof.

7. The method claimed in claim 6 wherein
    said first and second laser pulses are generated by $CO_2$ gas lasers.

8. The combination of claim 1 further comprising circuitry for tuning said first and second pulsed lasers in response to said beat frequency signals to compensate for long term instability of said pulsed lasers.

* * * * *

UNITED STATES PATENT AND TRADEMARK OFFICE
CERTIFICATE OF CORRECTION

PATENT NO. : 4,841,529
DATED : June 20, 1989
INVENTOR(S) : Ali Javan

It is certified that error appears in the above-identified patent and that said Letters Patent is hereby corrected as shown below:

Col. 1, line 66, replace "$\omega_{13}$" with -- $\underline{\omega}$ --.

Col. 2, line 11, replace "$\underline{\omega} = \underline{\omega}_r \; t(dw/at\; o)$" with -- $\underline{\omega} = \underline{\omega}_r - t\frac{d\omega_o}{dt}$ --.

Col. 2, lines 12-13, replace "$\gamma dw/dto$" with -- $\gamma \frac{d\omega_o}{dt}$ --.

Col. 2, line 14, replace "$\gamma dw/dt\; o$" with -- $\gamma \frac{d\omega_o}{dt}$ --.

Col. 3, lines 8-9, replace "elector-optic" with --electro-optic--.

Signed and Sealed this

Eighteenth Day of September, 1990

Attest:

HARRY F. MANBECK, JR.

*Attesting Officer*    *Commissioner of Patents and Trademarks*